March 26, 1929. T. RIGBY 1,706,747
APPARATUS FOR MAKING CEMENT BY THE WET PROCESS
Filed Dec. 8, 1922 2 Sheets-Sheet 1
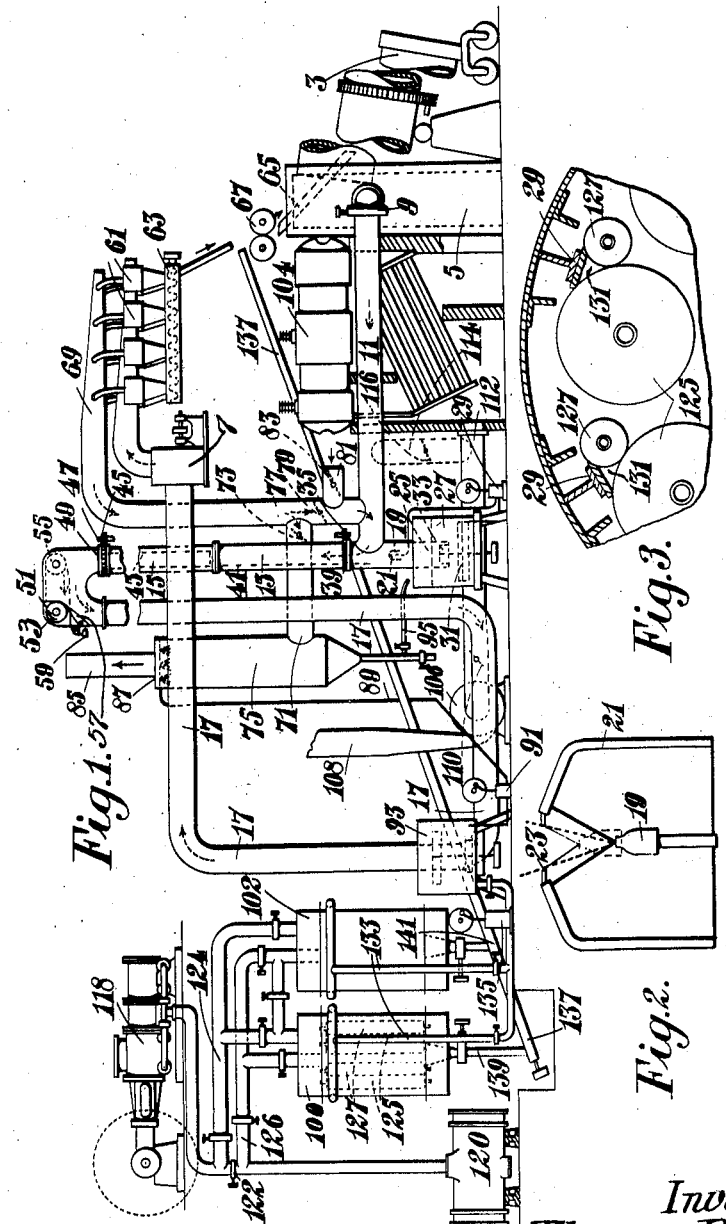
Inventor
Thomas Rigby
by Wilkinson & Giusta
Attorneys.

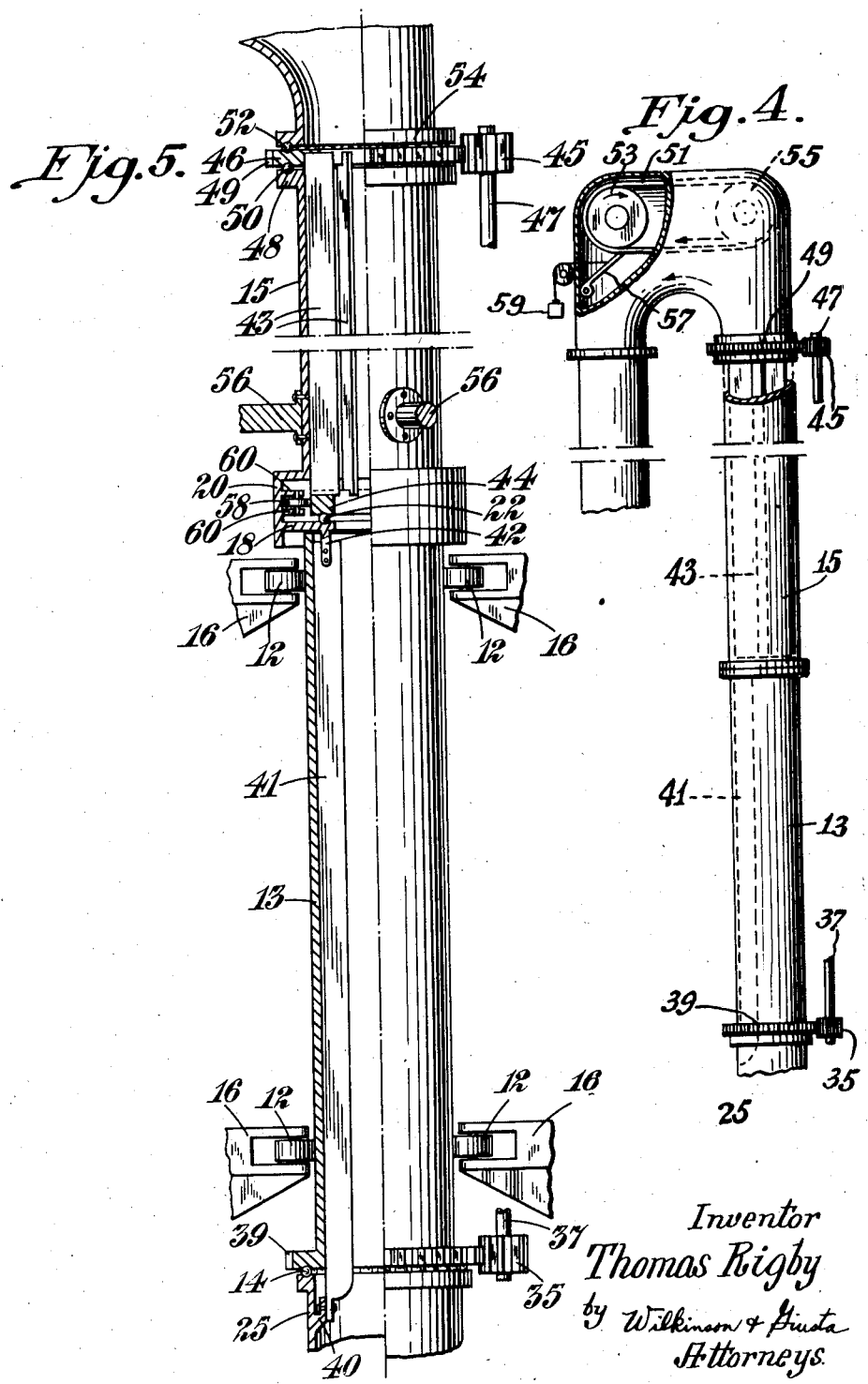

Patented Mar. 26, 1929.

1,706,747

UNITED STATES PATENT OFFICE.

THOMAS RIGBY, OF LONDON, ENGLAND.

APPARATUS FOR MAKING CEMENT BY THE WET PROCESS.

Application filed December 8, 1922, Serial No. 605,680, and in Great Britain December 19, 1921.

This invention relates to the manufacture of cement (especially in plants of the rotary kiln type) and has particularly for its objects to secure economy of fuel used in the drying of the materials and the burning of the cement.

This the invention achieves by effecting drying outside the kiln in a particular way, and by the heat of gases discharged from the kiln, of material to be made into cement. The said particular way of carrying out this drying consists in dispersing the material in a rapidly moving current of the hot gases so that the same is held in suspension by the gases as they are drying it.

The invention may in its application under different circumstances take widely differing forms and before proceeding to a consideration of some of these varieties and their advantages it will be convenient to describe in detail and with reference to the accompanying drawings a plant which may be regarded as one example of plant according to the invention.

This illustrative plant is constructed and arranged for dealing with cement slurry that is to say it is one intended for employment where the invention is applied to cement making by the wet method and where therefore a semi-fluid slurry containing say some 40% of water and all the ingredients for making the cement is to be dried according to the invention. It should, however, be pointed out that the invention is not confined to cement making by the wet method since the gases discharged from a so-called dry kiln are amply hot enough even when cooled under steam-raising boilers (as is sometimes done at the present time) to be used as drying medium in the particular way aforementioned for removing excessive moisture from an individual material of those to be mingled together in the apparently dry condition for discharge in this condition into the kiln in cement making by the dry method.

In the accompanying drawings which are to be regarded as purely diagrammatic (and in which in the interests of ready understanding details of plant construction making for efficiency and obvious to those skilled in the arts of drying materials and conveying gases, such as the introduction of one gas current into another by a duct discharging into another at a small acute angle in the direction of flow of the mingled currents rather than perpendicularly or at a large angle are omitted).

Figure 1 is a general elevation of the plant;

Figure 2 shows an arrangement for controlling the discharge of slurry into the current of gases;

Figure 3 is a plan indicative of a convenient way of spreading the slurry on the drying surfaces of film drying apparatus by which in the illustrative plant the apparatus for drying the material in suspension in a gas current is shown as supplemented, and Figure 4 is a detail enlarged side elevation, partly in section, of the central portion of the plant as shown in Figure 1;

Figure 5 is an enlarged view, partly in section, of the right hand portion of the tube shown in Figure 4.

In the plant shown hot gases discharged from the rota y kiln 3 into the flue 5 can be drawn by a fan 7 through a control damper 9 and duct 11 into a drying duct composed of a rising portion (comprising parts 13 and 15 hereinafter referred to) and a portion 17 of any convenient disposition and length connecting the top of the rising portion and the fan. The slurry is discharged into the gas current at the bottom of the rising portion of the duct and the particular devices shown in this instance for this purpose comprise a spraying jet 19 (see also Figure 2) located in a hood 21 preferably suitably insulated having an opening 23 above, and coaxial with, the jet. The hood is situated in a downward extension 25 of what has been referred to as the rising portion of the drying duct so that both it and the jet within it are out of the direct hot gas current discharged by the duct 11. The hood acts to shield the jet from the hot gas and to trap on its inner surface such portion of the material discharged from the jet as would otherwise fail to be taken up by the gas current and be apt to be deposited on the wall of the drying duct and accumulate thereon or fall back in a partly dried and objectionably lump condition into the slurry tank 27 below the extension 25 and from which the pump 29 supplies the jet with slurry. The slurry trapped by striking the inner surface of the hood flows down the same back into the tank to be mingled with the supply to the tank which is kept well mixed by the power-operated paddles 31, 33, the latter of which is conveniently, as shown, placed in the bottom of the extension 25 which is sealed by dipping in the supply of slurry. Provision is made for adjusting, by any convenient means, the relative heights of the jet 19 and hood 21 so that the latter may be employed to control the spread of the jet of slurry and the rate of admission of slurry into the gas current. These latter functions of the hood will become apparent from Figure 2 which shows how the distance of the jet 19 from the opening 23 affects the contained angle of the jet of slurry and the proportion of the jet of slurry which is actually discharged into the current of gases.

While the material is still moist it is apt to cohere and is prone to deposit on and build up on the walls of the duct if perchance it touches the same and it is to reduce the likelihood of this latter occurrence that the slurry is preferably introduced into the gas current in, as shown, a substantially vertical section of the duct. In addition it is preferable so to correlate the temperature of the gas current meeting the slurry, the velocity of that current and the amount of slurry discharged into the current that before the current suffers a marked change in direction inducing deposition (that is in this case before the top of the vertical section of duct is reached) the material shall have been dried beyond the condition in which it is still apt to adhere to the duct walls. While different conditions would dictate widely varying proportions of drying duct it may here be convenient to indicate that a first vertical section 13 and 15 of some 40 feet in length of a total length of drying tube of say 150 to 200 feet would be in no sense out of the range of convenient and likely sizes. To guard against accumulation of deposit in the vertical section of the duct it is preferable to provide cleansing devices and convenient forms are indicated in the drawing. For this purpose the section 13 through which the material passes in its wettest state is preferably made rotatable) being say driven by a pinion 35 on a power shaft 37 and engaging a pinion 39 fast on the section 130 and supported on the extension 25 by means of a ball bearing 14. Guide rollers 12 mounted in brackets 16 carried by any suitable part of the plant are provided to maintain section 13 in position transversely. In the interior of the section 13 is a stationary scraper 41, which is fixed at its lower end to a lug 40 on the inside of the extension 25. The upper end of the scraper 41 is fixed to a lug 42 which projects downwardly from a ring 18 on the interior of an enlargement 20 of the stationary section 15. Thus any tacky material which may become deposited on the wall of the section 13 is scraped off by said scraper and drops back into the slurry tank. Where the material is drier in the upper portion 15 of the vertical section of the duct and more likely to behave as a solid when scraped off and to be in a condition favouring its being carried forward by the gases, it is preferable to use in this portion a group of rotary scrapers placed a small distance apart peripherally of the duct. To this end a group of scraper bars 43 extending longitudinally of the tube between end rings 44, 46 are conveniently provided and are caused to rotate axially of the duct within the stationary section 15, as by a pinion 45 fast on a shaft 47 and engaging a pinion 49 fast on the upper end ring 46. The lower end ring 44 is supported on the ring 18 by means of a ball bearing 22, and the upper end ring 46 is rotatably mounted on a flange 48 on the section 15 by means of a ball bearing 50. A ball bearing 52 is also interposed between the end ring 46 and a flange 54 on the upper part of the duct. The stationary section 15 is maintained in position by brackets 56, and the end ring 44 is guided transversely by means of rollers 58 mounted in lugs 60 provided on the interior face of the enlargement 20 of the section 15.

Where the gas current suffers a marked change of direction at the upper part of the rising section of the duct and the suspended material tending to retain its direction of motion is impelled towards the margin of the current of gases there is preferably provided a device which ensures that if for some reason the material is still apt to deposit on the walls of the duct accumulation of such deposit will be prevented and in the construction illustrated this takes the form of an endless band or belt 51 passing over pulleys 53, 55 and forming in effect the wall of the tube on which the outer portions of the gas current impinge as the latter sweeps round the bend into the duct 17. The band is driven by the pulleys in a direction to bring any deposit upon it over the duct 17 into which the deposit drops, to be borne away by the gas current, as it is scraped off the band by a scraper 57 past which the band travels and which is kept pressed against the latter, as by a weight 59, it being understood that the higher the speed of the band or the like the thinner is the deposit and the greater the likelihood of the latter being detached by the scraper in a comparatively fine condition in which the gas will once more carry it along.

The fan 7 impels the current of gases to a battery of cyclone dust separators 61 wherein the slurry dried, it may be, to contain something under 10% of water is deposited and from which it is fed by conveying means 63 to the inlet chute 65 of the kiln after being consolidated, if this is desired, by any suitable form of briquetting device such as a rotary press forming avoid briquettes and indicated at 67 or being slightly moistened to cause it to cohere and avoid to great an expulsion of the material as dust from the kiln by the gases leaving the same. Where the moisture content of the material deposited in the cyclone separators is substantially greater than that just referred to, stirring or conveying means may be necessary in the separators to avoid clogging therein.

As the volume of hot gases available from the duct 11 will not ordinarily suffice for the convenient transport, to dry the same in suspension, of that quantity of slurry which it is desired to dry in suspension it is generally desirable to augment this volume either by addition of air or by returning to the drying duct a portion (and maybe the bulk) of the gases after the separation of dried material therefrom or in both these ways and it is for this reason that the duct 69 leading the gases from the cyclone separators is branched so as to lead by a branch 71 (in which is a control damper 73) to a washing tower 75 and by a branch 77 (in which is a control damper 79) to the duct 11 and that there is an air inlet 81 (controlled by a damper 83) to the branch 77. The washing tower through which such part of the drying current as is finally rejected passes to the chimney 85 is furnished with spraying devices 87 which may be supplied with slurry (instead of water which would militate against the economical recovery of the dust) through a pipe 89 by a pump 91 fed from a slurry tank 93 the washings in such an event being conveniently diverted through a pipe 95 to the tank 27 so that the slurry which has in washing the gases been enriched (by the dust extracted from these and, if the gases reaching the tower through the branch 71 are still at a temperature substantially above their dew point, also possibly enriched by actual evaporation of water therefrom in performing the gas washing) is added to the slurry supply for the jet 19.

While the maintenance of the temperature of the gases reaching the washing device at a temperature sufficiently above their dew point will avoid dilution of the slurry by condensation (and may as pointed out above even result in concentration of the slurry) such deposition may alternatively be guarded against by warming the slurry to be used in gas washing.

As will more clearly appear from the discussion hereinafter of the different circumstances likely to be met with and the variations of plant which the attainment of highest fuel economy may favour in various circumstances it will sometimes be advantageous to associate a different form of drying plant with an installation such as has been so far described with reference to the drawings and which installation is on the other hand a complete entity and will often be preferred in this form on account of its low capital cost and general simplicity even at the sacrifice of some economy of fuel. Such an associated plant is shown in the drawings and takes the form of a high economy steam-heated film drier. Two such driers are indicated at 100, 102 and may derive their heating steam directly from boilers heated by the kiln gases or from the exhaust of steam driven prime-movers supplying power for the cement works and heated it may be by steam generated by the heat of the kiln gases. Again a plurality of such driers may operate independently or in multiple-effect.

Steam for such a purpose may be derived from a boiler 104 heated by gases drawn from the flue 5 by a fan 106 which discharges the gases through a chimney 108, there being a control damper 110 in the duct 112 connecting the fan and the boiler flue and there being also if desired a connection controlled by a damper (indicated respectively at 114 and 116) between the ducts 112 and 11 so that gases from the boiler flue instead of directly from the flue 5 may be drawn through the drying tube by the fan 7. At 118 is indicated an engine, say supplying power for the cement works, which may be furnished with its steam wholly or in part from the boiler 104 and the exhaust from which instead of passing directly to the condenser 120 may wholly or in part be diverted by means of the valve 122 into the film driers through the duct 124 to heat the same and the steam generated in these (or in the low temperature one thereof if by closing certain of the valves shown and opening others the driers are employed in multiple-effect rather than as independent units in parallel) led to the condenser by the duct 126. The heating surfaces of the driers are shown as constituted by the surfaces of upright drums 125 through the upper hollow spindles of which the heating medium enters the drums and the slurry is assumed to be spread thereon by smaller drums 127 having a peripheral speed differing from that of the larger drums, the slurry being supplied to the bite of the drum pair from a slurry conduit 131 formed by a bridge piece 29 and these conduits being supplied through ducts 133 with the slurry from the tank 93 by means of a pump 135. At 137 is indicated a conveyor which receives the dry material from the driers 100, 102, through the ducts 139, 141, and delivers it directly to the chute 65 or to the briquetting device 67 if one be used.

Such a connection as 114 may be convenient in allowing the drying duct to be supplied with gases from the boiler flue during periods when there is a considerable call for power and to be supplied with gases directly from the kiln at times (such as week-ends) when the power needs of the plant, for mixing, crushing and so forth, are largely cut down.

The details of construction of such film drying apparatus as last referred to have not been set out herein since reference may be made to the specification of my British Letters Patent No. 180963 for constructional features which it is preferred to employ in the interests of efficiency in film drying apparatus used in carrying out the present invention.

Having considered in detail one form of the invention it now becomes possible to appreciate more readily the advantages possessed by the process of drying the material in suspension in a current of hot kiln exit gas before the material is introduced into the kiln—a process which actually turns to useful account that transporting capacity of the kiln gasses which has always been regarded by the cement manufacturer of today as troublesome and costly in impossing upon him the need of equipping the kiln with dust catching devices to cleanse the kiln gases of cement and cement materials dust in order to avoid nuisance and loss.

If one regards the problem of fuel economy in cement making as dependent upon one's ability to discharge the kiln gases from the system only after they have been cooled, in effecting useful heating in cement making, to a low temperature it becomes apparent how advantageous the process in question is since the gases may be discharged from the drying duct just above saturation point at a temperature of say 80 deg. C.—a degree of of cooling, as the result of drying action, which is unattainable in practice by any other drying process. Moreover since gases at quite a low temperature say as low as 200 deg. C. may usefully be employed as the drying medium in such a process it follows that even gases cooled after leaving the kiln by raising steam in a boiler do not need to be rejected from the system then but can do still further useful work as has been indicated.

These results flow, manifestly, from the intimacy of contact between and the resulting quick and complete heat transfer of heat between the gases and the material to be dried which the dispersal of the material in the gas current and its continued suspension therein admit of.

The employment of such a process in making cement by the wet method markedly increases the cement output possible with a given kiln and in the case of complete drying of the slurry before it enters the kiln the duties of the latter become exclusively those of heating the dry materials and thereafter clinkering them as in making cement by the dry method.

It should be understood, however, that the invention is not in any way limited to the use of one kiln only; as described, for the hot gases for drying may be taken from a kiln other than that into which the dried materials are fed.

The order of economy in fuel obtainable by the use of the process is best indicated by stating that overall fuel savings ranging from about 33% to about 60% can be shown by calculations of the thermal values involved in carrying out the process in various forms. Thus assuming that slurry of a water content of 40% is used, that coal is burnt to fire the kiln which has a gross calorific value of 6800 calories per kilo. and that the temperature at the hot end of the kiln (assumed to be of the rotary type) is 1450 deg. C. it can be shown in this way that (a) when using merely a drying duct in which the slurry is dried as indicated in suspension in the kiln gasses and in which the heat of the gases (leaving the kiln under these conditions at some 600–800 deg. C. rather than the more customary 400 deg. C. which occurs when the kiln has to perform the drying) is reduced in temperature by drying to some 80 deg. C., a fuel economy of some 33% should be expected; (b) when using in the drying duct kiln gases already cooled in raising steam to provide part of the factory power and furnish exhaust steam for a film drier (for part of the slurry) interposed as described, between the prime mover and the condenser an overall fuel economy of some 60% should be expected; and (c) when using in a combination of film and suspension drying as last described steam for the power plant (which provides the exhaust steam for the film drier) which is generated otherwise than by the heat of the kiln gases and using these latter for the suspension drying at a kiln exit temperature of say 600 deg. C., a fuel economy of some 50% should be expected.

While preferably the process will be so conducted that by the control of the rate of admission of slurry to the gas current (which it may be pointed out may reach a velocity of 60–70 feet per second or upwards in the drying duct) it will be assured that the gases are finally rejected in a nearly saturated condition at a temperature of some 80 deg. C and the slurry will be practically dry when the process is working normally yet it should be understood that the process is susceptible of many variations since the drying of cement material by suspension in a current of hot kiln gases may, to give instances, be advantageously adopted to effect the drying in but a comparatively short duct, and consequently by but a partial cooling of the gases, of only a small proportion of the material or the drying of a larger proportion to a lesser degree or adopted to dry further a quantity of slurry partly dried on a high heat economy film drier or adopted to dry material by exposing one batch thereof to the current at a relatively high temperature and another batch thereof to the same current at a lower temperature after the first batch dried thereby has been separated therefrom.

It will be understood that, without departing from the invention, methods and devices differing widely from those above described may be adopted for dispersing in the current of gases the material to be dried and especially will this be so when the material treated is not in a condition admitting of its being dealt with as a liquid or semi-liquid and spraying by a jet is impracticable. It may be preferable to disperse the material in a current of gas, such as air or circulated gases supplies corresponding to those supplied in the example fully described above through the ducts 77 and 81 respectively, which only becomes heated and an active drying current after it has travelled so far from the location at which it received the dispersed material that that portion of the material which it does not readily transport shall have been dropped by it under conditions which are not so likely to cause difficulties as those presented by the dispersal of the material into hot gases which by heating the duct walls and exerting an immediate drying action on the material thrown into the current require that special measures, such as have been described with reference to the drawings, be taken to avoid caking of the material on the duct walls and the formation of lumps and masses of semi-dried material from that portion which is not carried speedily away by the current. In dealing with cement slurry it is to be observed that the smoother the duct walls the less prone is the spray to stick thereon when it strikes the same and, for example, the enamelling of the duct walls may therefore be considered advantageous.

Moreover, while in the example described the drying duct has been considered as equipped only at the first bend and in the course of its length to that bend respectively with a band or like device to reintroduce deposited material into the gas current and with duct scraping means it should be pointed out that such devices may be used, as the case may be, at any other bend or length of the duct and it should further be pointed out that such duct scraping means may be replaced or supplemented by other forms of device such as duct hammering or vibrating means acting to detach deposit from the duct walls.

While reference has been made above to the use of cyclone dust separators as means for separating the bulk of the dried material from the drying gases and of washing devices for removing thereafter further quantities not recoverable by such dust separators it should be pointed out that other forms of depositing chambers or else dust filters may take the place of the cyclone dust separators or that such filters may be used as auxiliaries to such separators or to other forms of depositing chamber to trap residual dust in the gases it being worthy of note that the low temperatures to which these gases can be and usually are brought in this method of drying admit of the use of highly efficient filtering cloths or the like which may be unutilizable in current practice owing to the destructive action of the high temperature of the kiln exit gases.

Again cyclone dust separators or other depositing chambers may be used in series so as to free the gases step by step to a greater and greater degree from suspended dust and reduce the duty on the ultimate washing or filtering devices if such remain necessary. Customarily the clinker leaving the cement kiln is cooled in heating air which is to support combustion in the kiln furnace, and while the clinker may in carrying out the present invention be cooled instead by air which is thus heated to fit it for use as drying medium in the drying duct, yet it may occur in carrying out this invention that the economy in fuel consumption brings with it such a reduction in the heat which can usefully be, or needs to be, abstracted from the clinker by a more limited quantity of air needed for burning the lesser quantity of fuel that an extra quantity of air can be heated in cooling the clinker and this excess diverted to the drying duct to supplement the kiln gases therein. Even more advantageous is it to abstract any such excess of heat from the clinker by gases from the drying duct which, having had the dried suspended material removed therefrom to the highest degree which the plant admits of, are heated by the clinker and used anew as drying medium in the duct since in this case heat of the clinker is not uselessly consumed in heating up gas from atmospheric temperature to a temperature well above the same and yet below which it cannot be cooled by drying action.

I claim:—

1. In an apparatus for making cement by the wet process, an up-right tube for drying slurry connected adjacent its lower end to a gas exit of a cement kiln and at its other end to a centrifugal dust separator and collector, a slurry spraying device at the lower end of the drying tube, a scraping member bearing against the inner wall of said tube for removing the slurry, and means for rotating said scraping member.

2. In an apparatus for making cement by the wet process, an up-right tube for drying slurry connected near its lower end to a gas exit of a cement kiln and at its other end to a centrifugal dust separator and collector, a slurry spraying device at the lower end of the drying tube, an endless band mounted at the top of the drying tube in such a manner to be engaged by the gas stream containing the suspended slurry for collecting the slurry, a scraping member bearing against said band to detach the slurry collected thereon, and means for moving the endless band.

3. In an apparatus for making cement by the wet process, a slurry-drying tube having two vertical parallel limbs joined at their upper ends by a bend and whereby one limb is connected near its lower end to a gas exit of a cement kiln while the other limb is connected to a centrifugal dust separator and collector, a slurry spraying device at the lower end of the first-mentioned limb of the drying tube, a moving endless band mounted in said bend and extending thereacross so as to be engaged by the gas stream containing the slurry, a scraper arranged at the upper end of the second-mentioned limb to detach the slurry collected on the moving band, and means for moving said endless band.

In testimony whereof I affix my signature.

THOMAS RIGBY.